(12) United States Patent
D'Innocente et al.

(10) Patent No.: US 11,809,520 B1
(45) Date of Patent: Nov. 7, 2023

(54) LOCALIZED VISUAL SIMILARITY

(71) Applicant: Amazon Technologies, Inc., Seattle, WA (US)

(72) Inventors: Antonio D'Innocente, Berlin (DE); Nikhil Garg, Berlin (DE); Loris Bazzani, Berlin (DE)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 376 days.

(21) Appl. No.: 17/216,234

(22) Filed: Mar. 29, 2021

(51) Int. Cl.
| | |
|---|---|
| *G06F 18/214* | (2023.01) |
| *G06T 7/73* | (2017.01) |
| *G06T 11/00* | (2006.01) |
| *G06F 16/9538* | (2019.01) |
| *G06F 16/2457* | (2019.01) |
| *G06F 16/56* | (2019.01) |
| *G06F 16/54* | (2019.01) |
| *G06N 3/08* | (2023.01) |
| *G06F 16/9535* | (2019.01) |
| *G06V 10/75* | (2022.01) |
| *G06F 18/213* | (2023.01) |
| *G06F 18/2113* | (2023.01) |
| *G06Q 30/0601* | (2023.01) |

(52) U.S. Cl.
CPC ...... *G06F 18/214* (2023.01); *G06F 16/24578* (2019.01); *G06F 16/54* (2019.01); *G06F 16/56* (2019.01); *G06F 16/9535* (2019.01); *G06F 16/9538* (2019.01); *G06F 18/213* (2023.01); *G06F 18/2113* (2023.01); *G06N 3/08* (2013.01); *G06T 7/74* (2017.01); *G06T 11/00* (2013.01); *G06V 10/751* (2022.01); *G06Q 30/0603* (2013.01); *G06T 2200/24* (2013.01); *G06T 2207/20084* (2013.01)

(58) Field of Classification Search
CPC .......... G06Q 30/0601; G06Q 30/0603; G06Q 30/0643; G06F 18/214; G06F 16/24578; G06F 16/54; G06F 16/56; G06F 16/9535; G06F 16/9538; G06F 18/2113; G06F 18/213; G06N 3/08; G06T 7/74; G06T 11/00; G06T 2200/24; G06T 2207/20084; G06V 10/751
USPC ........................................ 382/305; 706/26.1
See application file for complete search history.

(56) References Cited

U.S. PATENT DOCUMENTS

| | | | |
|---|---|---|---|
| 8,732,030 B2 * | 5/2014 | Gokturk ............. | G06Q 30/0643 705/26.1 |
| 11,100,352 B2 * | 8/2021 | Lee ........................ | G06V 10/82 |
| 11,341,660 B1 * | 5/2022 | Garg ................... | G06Q 30/0603 |
| 2008/0212899 A1 * | 9/2008 | Gokturk ............. | G06Q 30/0603 382/305 |
| 2020/0104633 A1 * | 4/2020 | Zheng ................. | G06Q 30/0643 |

(Continued)

*Primary Examiner* — Kathleen Y Dulaney
(74) *Attorney, Agent, or Firm* — K&L Gates LLP (57) ABSTRACT

Devices and techniques are generally described for determining localized visual similarity. In some examples, a selection of a first location of interest on a first image data depicting at least one article of clothing may be received. In some examples, a first machine learning model may generate a feature map representing the first image data. In some examples, a reduced feature map may be generated based at least in part on a mapping of the first location of interest to the feature map. In some examples, a second image depicting at least a second article of clothing may be determined based at least in part on the reduced feature map.

20 Claims, 7 Drawing Sheets

(56) References Cited

U.S. PATENT DOCUMENTS

| | | | |
|---|---|---|---|
| 2020/0334287 A1* | 10/2020 | Xu | G06N 3/08 |
| 2021/0209408 A1* | 7/2021 | Ren | G06N 20/00 |
| 2021/0224312 A1* | 7/2021 | Harikumar | G06F 16/532 |
| 2022/0130069 A1* | 4/2022 | Kim | G06F 18/22 |
| 2022/0180476 A1* | 6/2022 | Poddar | G06N 3/045 |

* cited by examiner

LOCALIZED VISUAL SIMILARITY

BACKGROUND

Clothing items and other fashion items are increasingly being purchased online as opposed to in physical, "brick-and-mortar" stores. Clothing has evolved from its function of protecting the wearer from the elements to a representation of self-expression for many people to display their own individuality and character. The shift from brick-and-mortar shopping to online stores has vastly expanded the amount of clothing selection. However, searching for particular clothing items and/or items having particular details can be a time-consuming and/or frustrating user experience.

DETAILED DESCRIPTION

In the following description, reference is made to the accompanying drawings that illustrate several example embodiments of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Typical fashion retrieval methods aim at learning a clothing-specific embedding space where images are ranked based on their global visual similarity with an image provided as a visual search query. However, global embeddings struggle to capture localized fine-grained similarities between images, because of aggregation operations typical in the visual search process. Described herein are systems and techniques that learn localized representations for fashion retrieval based on user-specified local interest points of prominent visual features present in the images. Additionally, in some examples, a quadruplet loss function is described that offers improved performance at separating images in the embedding space by comparing negative samples at different levels of difficulties. Additionally, regularization techniques are incorporated into training (e.g., shared dropout and random local perturbation on the interest point). Such regularization enforces local invariance of visual representations. Currently, there are no existing fashion datasets useful for training on localized representations. Accordingly, described herein is a new dataset "FashionLocalTriplets," annotated by fashion specialists including triplets of fashion items and interest points. The proposed model outperforms state-of-the-art global representations and models trained on common fashion datasets.

Fashion retrieval may be defined as the learning of a clothing-specific embedding space. Existing fashion retrieval methods define the concept of similarity at the image level, such as global image representation, or use learnable attention-based models trained to aggregate local information. Such methods struggle when dealing with fine-grained visual differences between clothes, especially in the case where such visual differences are localized. To deal with this problem, described herein methods and techniques able to determine fine-grained, localized notions of visual similarity, where the similarity is defined based on the user-specified interest point of a prominent visual feature of a garment. This allows the techniques to focus on desired localized cues, such as specific sleeve types, necklines, and design patterns that are of interest to the particular user. In various examples, the systems and techniques described herein are able to learn an embedding space where globally similar images with local differences can be separated, while globally dissimilar images with similar local cues can be related to each other.

In various examples, a convolutional network (e.g., a convolutional neural network (CNN)) may be used to encode the fine-grained localized visual features. The convolutional network may receive as input an image (e.g., of a garment) as well as the location of a point of interest on the image. The point of interest may be selected by a user and may correspond to a single pixel and/or a small group of pixels of the input image. Localized features are extracted from the convolutional feature map at the point of interest location in a grid (or other patch) and may be aligned via bilinear interpolation, as described herein.

The model may be trained using a quadruplet loss function in order to be able to retrieve the most similar images by considering their local similarity between corresponding points in the images. One of the issues with standard triplet loss functions lies in treating all negatives samples (e.g., those training sample images (training instances) that are labeled as being "not similar" to a reference image) as equal. Consider a reference sample having a local query pattern (e.g., bell sleeves) and one of two possible negative samples: 1) a sleeveless pattern, and 2) another bell sleeve pattern. Training using the standard triplet loss function pushes both negatives away from the positive with the same force, despite the first negative being semantically farther away from the query than the latter. The proposed quadruplet loss addresses this issue by explicitly learning appropriate semantic distances between "hard" negatives and "easy" negatives. In general, the margin of loss associated with prediction of easy negatives as matches to a reference image may be greater than the margin of loss associated with prediction of hard negatives as matches to the reference images. For example, two loss terms may be used to distinguish between hard and easy negatives: 1) a distance with loss margin $m_{hard}$ between the positive and a hard negative, 2) a distance with loss margin $m_{easy}$ between the positive and an easy negative. The values of these margins may be set where $m_{easy} \gg m_{hard}$. There may be a number of different ways to differentiate between such "easy" and "hard" negatives. For example, the easy and hard negative samples may both correspond to the same category of item, but the hard negative may include a localized attribute of interest, while the easy negative may not include the localized attribute of interest. In other examples, the easy negative may be a different category of item, while the hard negative may be the same category of item (with respect to the reference image).

Additionally, in some examples, regularization techniques may be used during training, in order to provide feature invariance to random local perturbation of interest points. Random local perturbation of interest points may be provided by randomly moving the ground-truth interest point in the spatial domain to enforce that localized representations are invariant to small local movements of interest points. This generates multiple similar features during training which are associated to the same local attribute. In addition, coherent dropout and shared channel-wise dropout may be used for regularization to help reduce overfitting during training.

In order to train the local visual similarity model on localized points of an image, a new dataset garments annotated by fashion specialists, called FashionLocalTriplets is described. FashionLocalTriplets comprises triples of the form: a reference image with annotated interest point location and two candidate images. Fashion specialists annotated the interest points of prominent features of the garment, and decided which of the two candidates is more similar to the reference in terms of the local point. Both candidates share the given attribute with the reference, allowing for the creation of particularly difficult triplets focused on capturing fine-grained differences among local regions. FashionLocalTriplets allows the model to better learn localized representations to perform the task of image retrieval relative to non-localized methods.

Among other potential benefits, the various systems and techniques described herein include a model that is able to learn localized representations useful for discriminating between local variations when dealing with fine-grained differences. Additionally, a localized quadruplet loss is described to reflect that not all negative training samples are the same, leading to an accuracy improvement for localized visual search with respect to triplet losses. Additionally, a new regularization technique is described that includes random local spatial perturbation of ground-truth interest points, adding invariance to small local changes of the localized representations.

Machine learning techniques, such as those described herein, are often used to form predictions, solve problems, recognize objects in image data for classification, etc. For example, herein machine learning techniques may be used to detect the location and class of objects represented within frames of image data. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Figure 1:
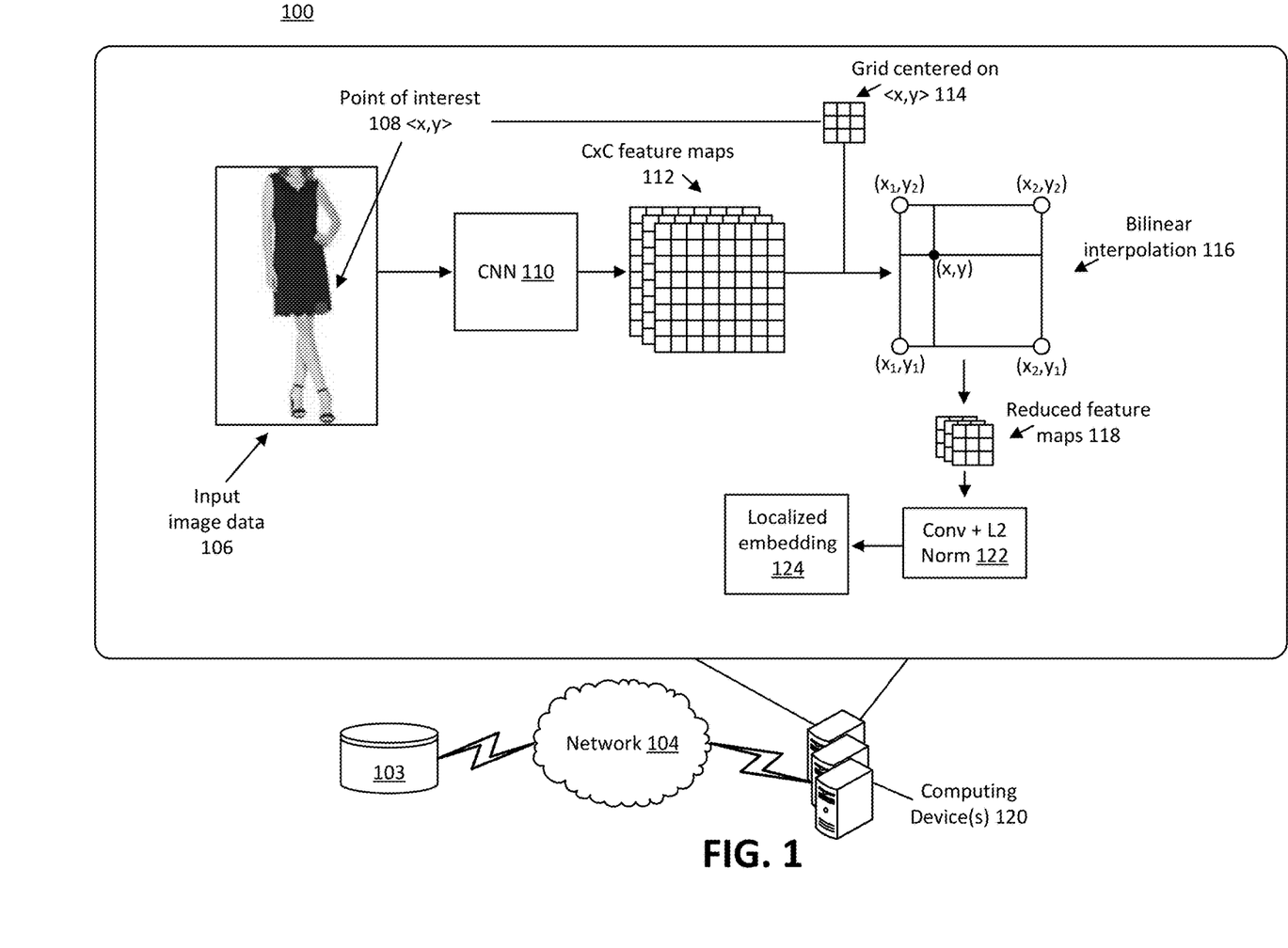
FIG. 1 is a diagram of an example system configured to encode localized visual features, according to various embodiments of the present disclosure.

FIG. 1 is a diagram of an example system 100 configured to encode localized visual features, according to various embodiments of the present disclosure. As depicted in FIG. 1, computing device(s) 120 may include a non-transitory computer-readable memory 103 and/or may be configured in communication with non-transitory computer-readable memory 103, such as over network 104. In some examples, non-transitory computer-readable memory 103 may store instructions that, when executed by at least one processor of computing device(s) 120, may be effective to perform one or more of the various techniques described herein. In various examples, network 104 may represent a local area network (LAN) and/or a wide area network (WAN) such as the internet. Computing device(s) 120 may be effective to implement system 100.

Many of the examples described herein relate to determining localized visual similarity between fashion images. However, the various local visual similarity techniques described herein may be used to determine localized visual similarity in other contexts. Accordingly, while the examples discussed herein relate to fashion, images of any objects and/or other visual representations may instead be used in accordance with the various techniques described herein.

In the example of FIG. 1, input image data 106 may be a frame of image data that depicts a garment of clothing when rendered on a display. In various examples, a user may select a point of interest 108 on the input image data 106. In the example, the user has selected point of interest 108 that corresponds to a pixel (or group of pixels) of the input image data 106. The point of interest is selected at or near the hem of the dress represented in the input image data 106, as the user may be interested in seeing other similar dresses that have a similar hem line.

The point of interest may be represented as a two dimensional coordinate (x, y) within the 2D pixel space of the input image data 106. The input image data 106 may be passed to CNN 110 (e.g., ResNet-50 and/or another CNN backbone network). C×C convolutional feature maps 112 may be extracted from an intermediate layer of the CNN 110. The feature maps 112 may be max-pooled features encoding location-sensitive information and/or may be feature maps extracted directly from convolutional layers (in accordance with the desired implementation). In various examples, the layers from which the feature maps 112 are extracted from the CNN 110 may be selected such that the feature maps 112 comprise global representation data that captures global information about the input image data 106 as well as information about local attributes. For example, selecting feature maps 112 that are relatively deep in the CNN 110 may allow the features represented by the feature maps 112 to represent the image globally (e.g., the entire image of the dress of FIG. 1), whereas features extracted from more shallow layers of the CNN 110 may represent more local features of the input image data. The exact layer(s) from which feature maps 112 are extracted may be implementation dependent and may be selected, in some cases, based on empirical testing. In general, the feature maps 112 may be extracted from a relatively deep layer of the CNN 110 such that the feature maps 112 capture both global context of the input image data 106 and local context of various regions of the input image data 106.

In an example, the point of interest 108 may identify a prominent local attribute of the input image data 106 (e.g., the hemline of the dress). The coordinate (x, y) of the point of interest 108 is defined in the pixel space (e.g., the coordinate corresponds to a pixel of the frame of input image data 106). However, the convolutional feature maps 112 are in a different space (e.g., a C×C feature space). Accordingly, there is not a direct spatial correspondence between the point of interest in the pixel space and the feature representation of the point of interest in the C×C coordinate space of the feature maps 112. Accordingly, a mapping between the point of interest in the pixel space and the corresponding feature representation in the feature maps 112 may be determined.

In various examples, the point of interest lies in a space of the feature maps 112 that is bounded by four neighboring grid points on the C×C feature maps 112 (e.g., four coordinates in the feature maps 112 defining a rectangle that corresponds to a region surrounding the first point of interest 108 in the pixel space). Although often described herein as a single point of interest, a location-of-interest of any size may instead be used. For example, a group of pixels may be selected (e.g., by drawing a bounding box). Accordingly, the feature vectors at these four nearest grid points to the location of interest may be bilinearly interpolated (e.g., using bilinear interpolation 116) to generate an approximation of the feature representation at the point of interest 108.

In the example depicted in FIG. 1, a grid of pixels centered on the point of interest in the pixel space (e.g., grid 114) may be sampled from the input image data 106 instead of simply using only the selected point of interest pixel. The grid 114 may be, for example, a 3×3 grid of pixels (or any other size grid) centered around (x, y) or otherwise inclusive of the pixel space coordinate (x, y) (e.g., the pixel space coordinate of the point of interest 108). The grid 114 may be used to capture a larger local context beyond using a single pixel. The interpolated feature representations may be determined for each pixel in the grid 114 to generate the reduced feature maps 118. The reduced feature maps 118 may be reduced in the sense that the feature maps is of the same dimensions as the grid 114, as opposed to being of C×C dimensions, akin to the feature maps 112 for the entire input image data 106. The reduced feature maps 118 may capture both local representation data representing local context of the point of interest 108 (as they are representative of the spatial portion of the image selected by the user as point of interest 108) and global representation data representing global context of the input image data 106 (as the features are bilinearly interpolated from the feature maps 112 extracted from a relatively deep layer of the CNN 110).

The bilinearly interpolated M×M (e.g., 3×3 or some other grid size) reduced feature map 118 may then be passed through a convolutional layer at block 122. Additionally, at block 122, the feature vector at the center location of the reduced feature map 118 may be $L_2$ normalized to generate the localized embedding 124 at the given point of interest 108. Note that although the receptive field of the localized embedding is concentrated on the interest point, it also captures some global information because feature maps from a deep layer of the CNN 110 are used, providing a combination of global and local similarity.

The combination of local context and global context of the reduced feature maps 118 allows for generation of a localized embedding 124 that also includes global context. Accordingly, localized embedding 124 may be useful for retrieving other images that are both globally similar to the input image data 106 and include localized attributes that are similar to the attribute represented by the point of interest 108 in the input image data 106.

Figure 2:
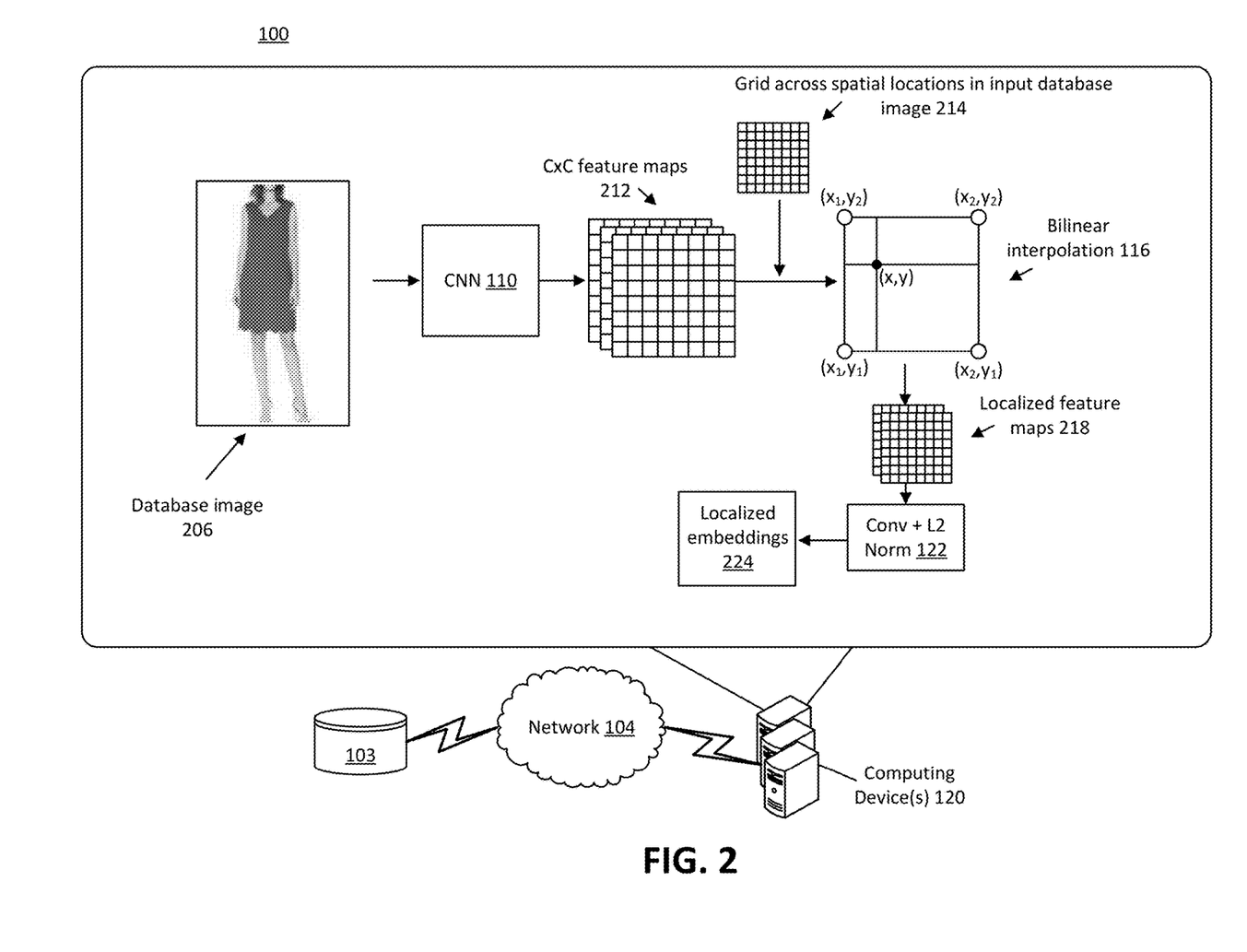
FIG. 2 is a diagram of the example system of FIG. 1 configured to determine feature embeddings at multiple interest points for database images, in accordance with various embodiments of the present disclosure.

FIG. 2 is a diagram of the example system of FIG. 1 configured to determine feature embeddings at multiple interest points for database images, in accordance with various embodiments of the present disclosure. In order to perform a visual search for images with localized similarity based on an input image and an input point of interest, localized embeddings for database images are computed at multiple interest points. Localized embeddings at multiple interest points may be efficiently computed in a single forward pass of the system 100 using the techniques shown and described in reference to FIG. 2. An M×M grid may be placed on the input images (e.g., database image 206). Localized features may be computed for each point of the M×M grid using bilinear interpolation 116 (M may take any desired value). In an example, if the M×M grid is of the same dimensions as the C×C feature maps 212 (e.g., if M=C) then no bilinear interpolation 116 may be used.

The grid across spatial locations in input database image 214 may represent the multiple points of interest from the input database image 206. In other words, each point of the grid may be considered a point of interest in the pixel space. Bilinear interpolation may be used to determine a feature representation of each point of the grid by bilinearly interpolating the four points of the feature maps 212 that surround a given grid point in the pixel space. Accordingly, localized feature maps 218 may be of the same dimensions as the grid across spatial locations in the input database image 214 and may represent a mapping of the multiple interest points from the pixel space to the feature space of the feature maps 212. Similar to the techniques described in reference to FIG. 1, the localized feature maps 218 may be sent to a convolutional layer and may be L2 normalized to generate localized embeddings 224 that may be used during visual search retrieval and in the loss functions for positive and negative samples, as described in further detail below.

Figure 3:
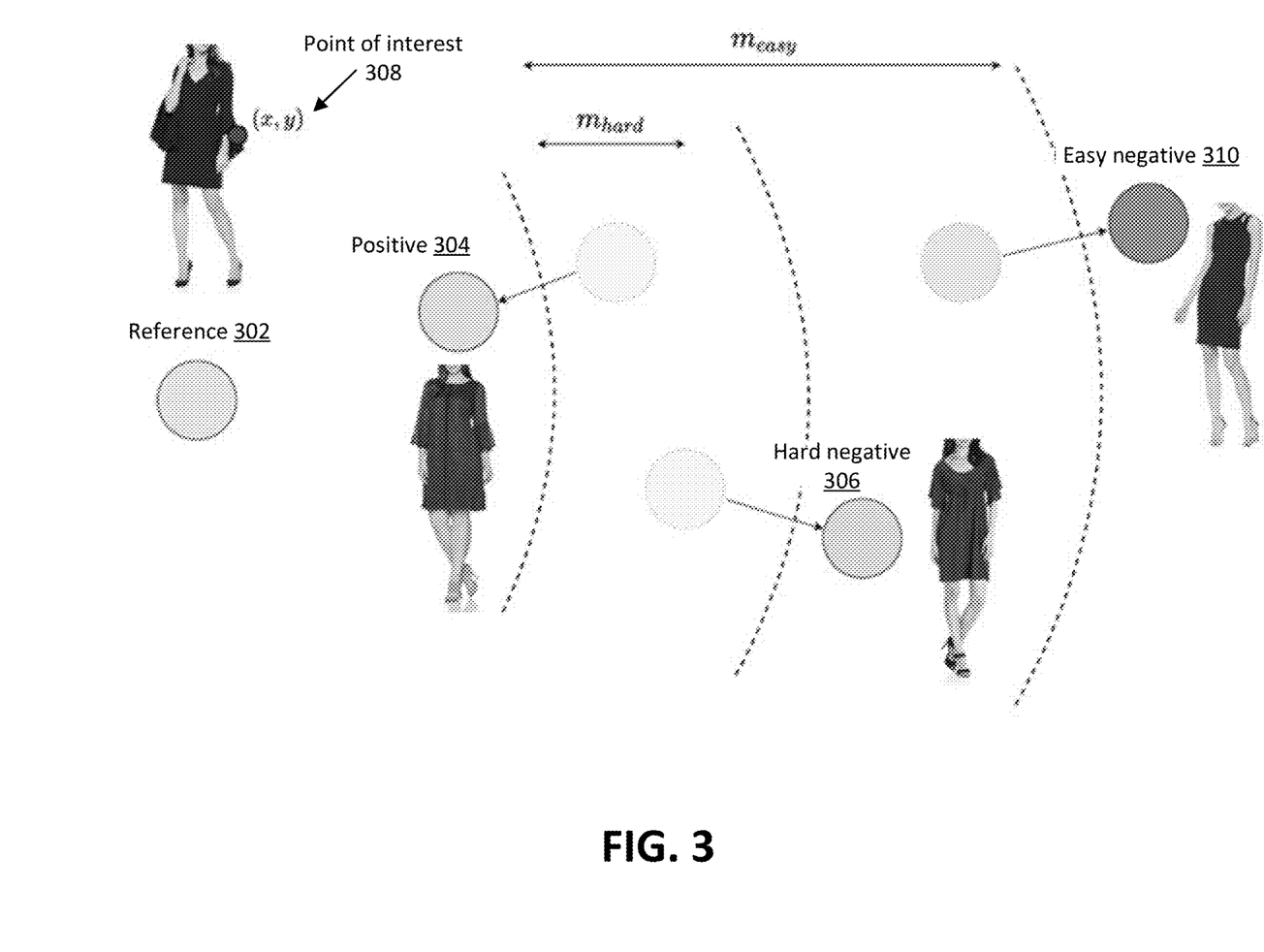
FIG. 3 is an example of training samples that may be used with a quadruplet loss function to train the various machine learning models described herein, in accordance with various aspects of the present disclosure.

FIG. 3 is an example of training samples that may be used with a quadruplet loss function to train the various machine learning models described herein, in accordance with various aspects of the present disclosure. Localized loss functions that may be used in accordance with the present techniques are described in further detail below.

The model described in FIGS. 1 and 2 may be trained using triplet and quadruplet loss functions, with a reference image 302 along with its interest point and two candidate images. The standard triplet loss is first described followed by extension of the standard triplet loss to incorporate localized features. Next, the proposed quadruplet loss is described. Advantageously, the quadruplet loss deals with negative samples at different level of complexity.

Triplet Loss. A typical choice for image retrieval is the triplet loss, defined for the global representation of images as follows:

$$\mathcal{L}_{global} = \sum_{n=1}^{N} \left[ \|g(I_n) - g(I_n^+)\|_2^2 - \|g(I_n) - g(I_n^-)\|_2^2 + m \right]_+ \quad (1)$$

where g(I) denotes the global embedding of an image I. $I_n$, $I_n^+$, $I_n^-$ indicate the n-th reference, positive and negative images respectively, N is the size of the dataset, $\lfloor z \rfloor_+$ refers to max(0, z) and m is the margin of the loss.

Localized Triplet Loss. The triplet loss of equation (1) may be extended to include the location of the point of interest, as follows:

$$\mathcal{L}_{local} = \sum_{n=1}^{N} \left[ \min_{c_n^+} \|f(I_n, p_n) - f(I_n^+, c_n^+)\|_2^2 - \min_{c_n^-} \|f(I_n, p_n) - f(I_n^-, c_n^-)\|_2^2 + m \right]_+ \quad (2)$$

where $p_n$, is coordinate (x, y) of the point of interest related to the reference image, and $f(I_n, p_n)$ is the proposed localized embedding (e.g., localized embedding 124) described in reference to FIG. 1. For the positive and negative sample images, the interest point is not available during training or prediction. Thus, the localized embeddings 224 may be computed on locations of the convolutional map, namely $c_n^+$ and $c_n^-$, as shown in FIG. 2. The min operations in Equation (2) have the effect of taking the localized feature in the convolutional map for the positive (or negative) image sample that is the closest to the feature of the reference point of interest (e.g., point of interest 308 from reference image 302) in the embedding space. In this way, the network is encouraged to learn to discriminate between regions in images that are similar (e.g., the sleeve regions in all the images in a triplet).

Localized Quadruplet Loss. The training of models with triplet loss functions is heavily influenced by the choice of negative sample images. For example, a local query may identify a point of interest related to the fashion attribute "bell sleeves" on a reference image of a dress. In the example, there may be two negatives sample images: a sleeveless dress sample image and another bell sleeve dress sample image. The triplet loss would update the model to push both negative samples away from the positive with the same force, despite the first negative being semantically farther away from the reference than the latter. In order to deal with this issue, hard negative samples (e.g., hard negative image 306) are included which have lower margins of loss relative to easy negative samples. In some example implementations, the hard negative images may include the same attribute as the attribute identified by the point of interest 308 in the reference image 302. On the other hand, easy negative image 310 may not have the same attribute as the attribute identified by the point of interest 308 in the reference image 302. However, as previously described, hard and easy negatives may instead be defined in different ways apart from the presence or absence of a localized attribute. For example, for the reference image 302, hard negatives may have long sleeves, while easy negatives may not include sleeves. Using both hard and easy negative images with a quadruplet loss function enables the model to learn a more robust localized embedding space.

Accordingly, the localized triplet loss of equation (2) is extended to include negative samples of different level of complexity (e.g., hard and easy negative samples). This allows for balance of the hardness of negatives by explicitly learning appropriate semantic distances between hard and easy negatives. The localized quadruplet loss is defined as:

$$\mathcal{L}_q = \sum_{n=1}^{N} \left[ \min_{c_n^+} \|f(I_n, p_n) - \quad (3) \right.$$

-continued $$\left. f(I_n^+, c_n^+)\|_2^2 - \min_{c_n^-} \|f(I_n, p_n) - f(I_n^-, c_n^-)\|_2^2 + m_{hard} \right]_+ +$$

$$\left[ \min_{c_n^+} \|f(I_n, p_n) - f(I_n^+, c_n^+)\|_2^2 - \min_{c_n'^-} \|f(I_n, p_n) - f(I'_n^-, c'_n^-)\|_2^2 + m_{easy} \right]_+$$

where $I_n^-$ is a hard negative (e.g., hard negative image 306) annotated by fashion specialists in a localized triplet loss dataset, and $I'_n^-$ is an easy negative (e.g., easy negative image 310) which may be randomly selected from the dataset. Setting a higher margin of loss $m_{easy}$, such that $m_{easy} >> m_{hard}$, enables the model to cluster easy negative images (e.g., easy negative image 310) farther away from the reference image 302 relative to hard negative images (e.g., hard negative image 306). Accordingly, a loss associated with prediction of an easy negative image as a match with a reference image incurs a greater loss during training relative to a prediction of a hard negative image as a match with a reference image. In the example of FIG. 3, positive image 304 may be labeled as a positive match with respect to reference image 302, whereas hard negative image 306 and easy negative image 310 may be labeled as negative matches with respect to the reference image 302. As described above, the margin of loss associated with the easy negative image 310 may be selected to be greater than the margin of loss associated with hard negative image 306.

Regularization

Two regularization techniques that enforce local invariance of visual representations and provide better training convergence are described below. Specifically, these regularization techniques include random interest point perturbation and shared dropout.

Random Interest Point Perturbation. During training, data augmentation may be applied which randomly moves the location of the point of interest (e.g., point of interest 308) on the reference image (e.g., reference image 302) within a radius of R % (e.g., R=20 or any other suitable threshold percentage or threshold distance from the point of interest) of the input image size (e.g., in terms of the height and/or width of the image frame in terms of pixels). The intuition is that the localized similarity should not drastically change even if the user specified interest point varies a bit in its exact pixel location. This augmentation has a regularization effect which significantly improves the results of the localized embeddings.

Shared Dropout. Additionally, the training of the model of system 100 may be regularized by applying a shared channel-wise dropout on the final localized embeddings before computing the loss. The dropout may be beneficial for improving the results both for the triplet and quadruplet loss functions. The dropout may be shared by randomly zeroing the same channels across all samples in a triplet/quadruplet, ensuring that the $L_2$ distance can be computed over the same non-dropped channels.

Figure 4:
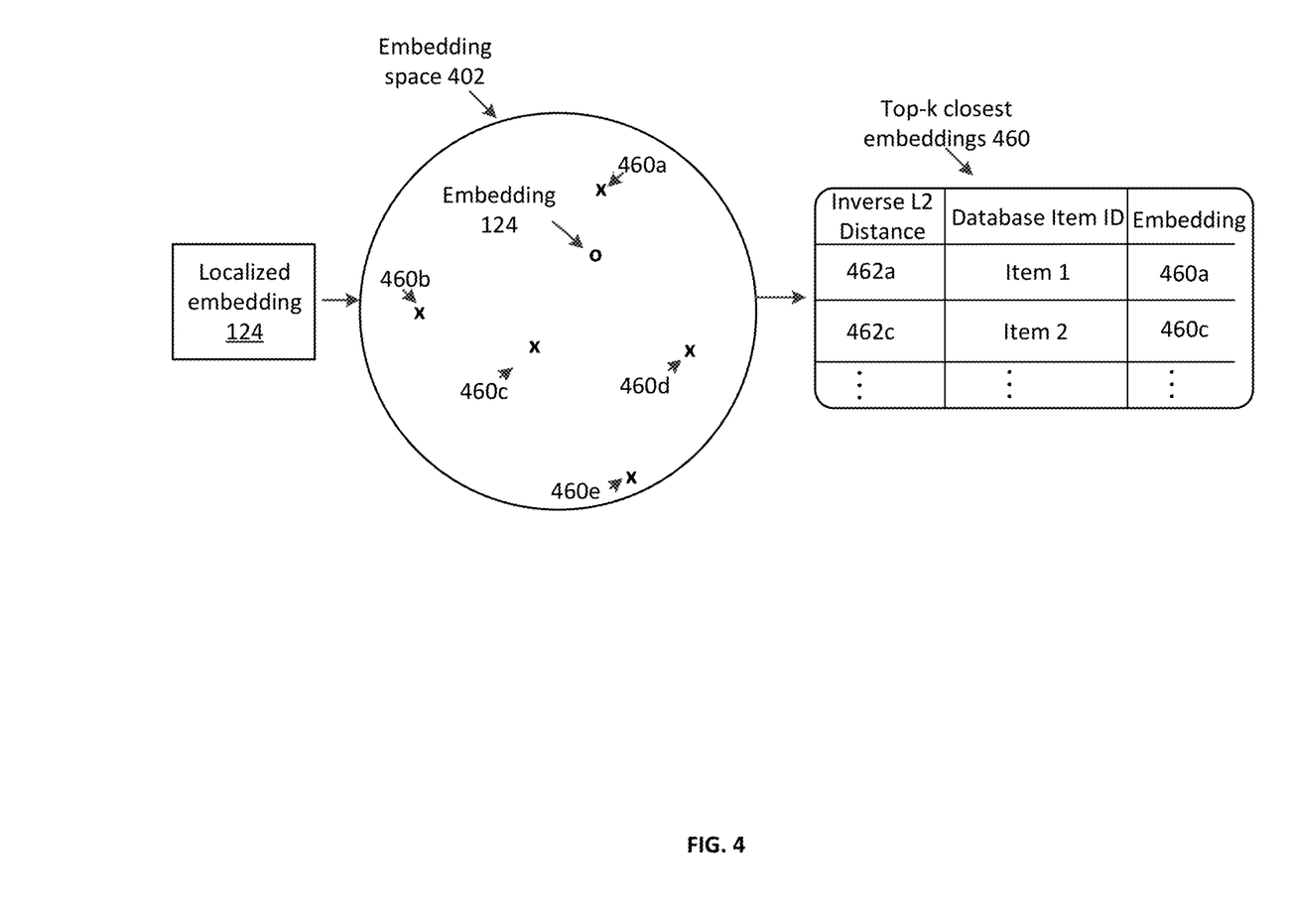
FIG. 4 is a block diagram illustrating use of localized visual similarity in visual search, in accordance with various embodiments described herein.

FIG. 4 is a block diagram illustrating use of localized visual similarity in visual search, in accordance with various embodiments described herein. The system 100 may output a localized embedding 124 that represents the input image data 106 both globally and at a user-selected point of interest 108. Additionally, localized embeddings 224 may be generated for a database of images at multiple points of interest, as described in reference to FIG. 2. Accordingly, visual search may be performed for similar items (e.g., fashion items and/or other objects that are similar both globally and in terms of an attribute corresponding to the user-selected point of interest 108).

In various examples, the localized embedding 124 may represent the point of interest 108 of the input image data 106 in the embedding space 402. The embedding space 402 may be a multi-dimensional feature space describing image data in a plurality of different dimensions.

In the example, a user may wish to find other, similar items that are visually similar to the dress (or other object) depicted in input image data 106 and which also have a similar hem line (or other attribute) represented by the point of interest 108.

A semantic retrieval operation may be performed to determine the top-k closest embeddings 460 to the input localized embedding 124. For example, a search index may be generated and used to compare the current embedding (e.g., localized embedding 124) to all neighboring embeddings within the embedding space 402. The search index may be used to find the embedding vectors of embedding space 402 with the largest cosine similarity (or smallest Euclidean distance or other similarity score used to determine a degree of similarity between two embedding vectors). Since the embedding vectors may semantically represent the images of the items of the database at multiple interest points, the cosine similarity (or other similarity metric) may represent the semantic similarity between the two images and the similarity of the point of interest to interest points within the database items.

In the example depicted in FIG. 4, the top-k closest embeddings 460 may rank the top-k closest embeddings 460 using the inverse L2 distance (e.g., based on respective similarities between the input localized embedding 124 and the localized embeddings of database items in the embedding space 402). The closest embedding (e.g., the highest ranked embedding having the highest inverse L2 distance 462a) may be embedding 460a. Embedding 460a may correspond to Item 1 in a database (e.g., an e-commerce database) as the embedding 460a may represent one or more images of the Item 1 in the database. Embedding 460c may be the next closest embedding to the localized embedding 124 (e.g., the next highest ranked embedding having the second highest inverse L2 distance 462c). Embedding 460c may correspond to Item 2 in the database. In various examples, a list of the top-k closest items to the input item and point of interest may be output to the user (e.g., as a ranked list on a graphical user interface).

Figure 5:
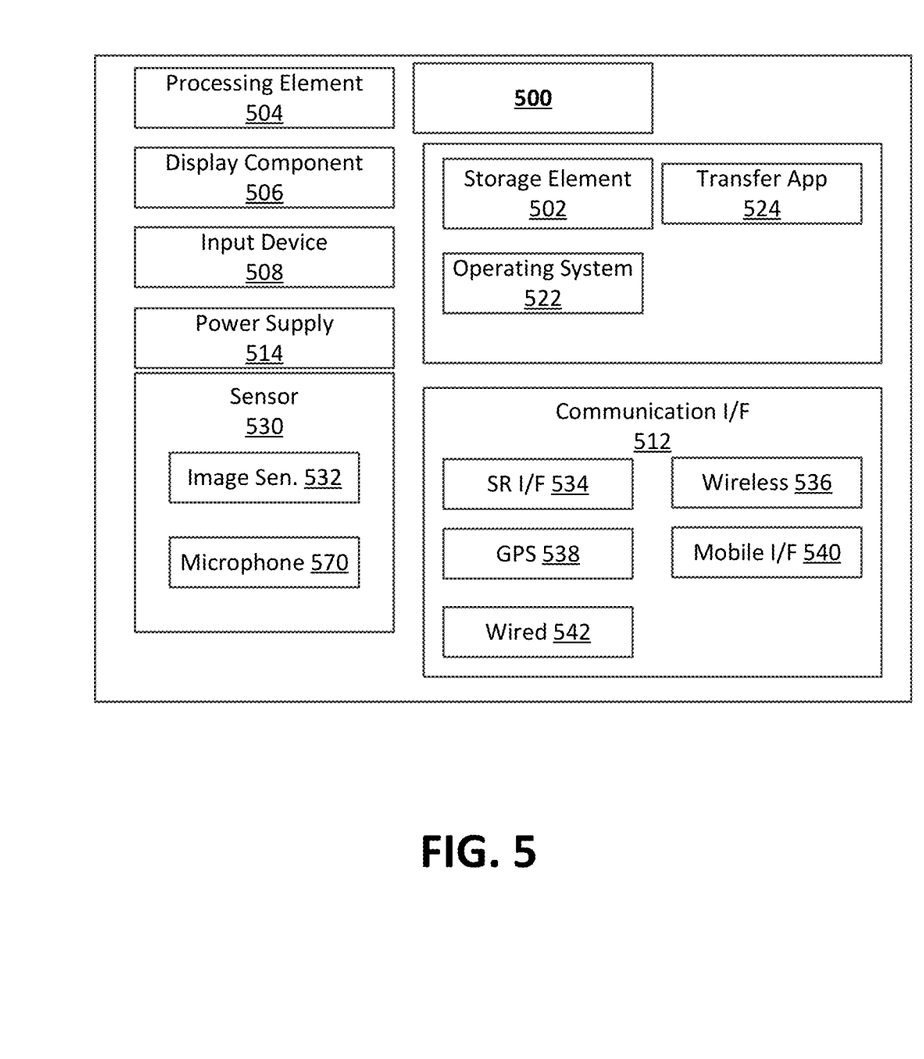
FIG. 5 is a block diagrams showing an example architecture of a computing device that may be used in accordance with various embodiments described herein.

FIG. 5 is a block diagram showing an example architecture 500 of a computing device that may be used in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store segmentation masks generated using the segmentation techniques described herein. In another example, storage element 502 may store one or more machine learning models (and/or parameters thereof) used for localize visual similarity, as described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display input images and/or visually similar images generated and/or identified in accordance with the various techniques described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing device(s) 120, as described herein, are exemplary, and may be located as a stand-alone device or may be included, in whole or in part, as a component of a larger device or system.

Figure 6:
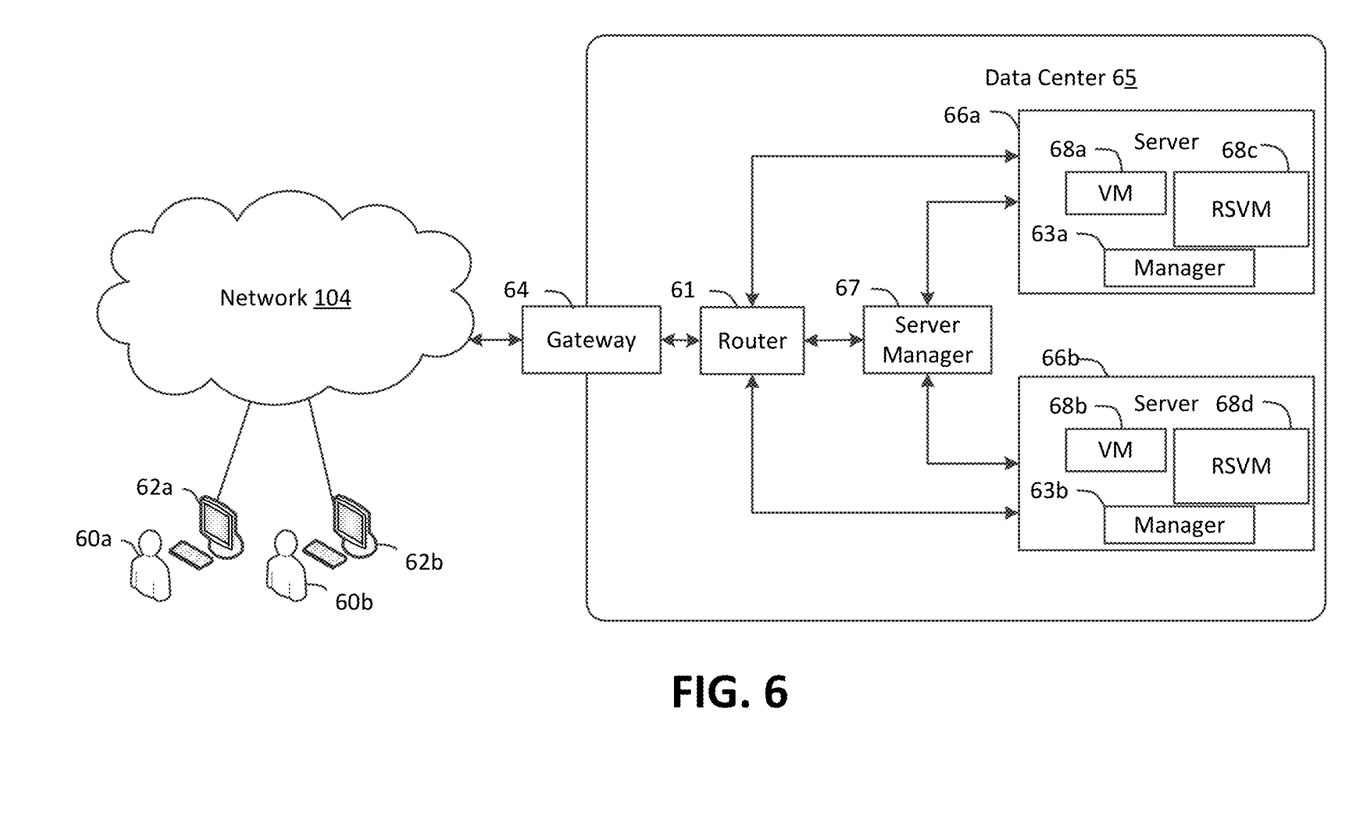
FIG. 6 is a diagram illustrating an example system for sending and providing data that may be used in accordance with the present disclosure.

An example system for sending and providing data that may be used to determine localized visual similarity will now be described in detail. In particular, FIG. 6 illustrates an example computing environment in which the embodiments described herein may be implemented. For example, the computing environment of FIG. 6 may be configured to determine localized visual similarity as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various image processing techniques described herein.

These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources—consisting of many processors, large amounts of memory and/or large storage capacity—and small resources—consisting of fewer processors, smaller amounts of memory, and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box, or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and may, alone or in combination, manage communications within networks in data center 65, for example, by forwarding packets or other data communications as appropriate based on characteristics of such communications (e.g., header information including source and/or destination addresses, protocol identifiers, size, processing requirements, etc.), and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated, and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, configured to implement and distribute the infrastructure, and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
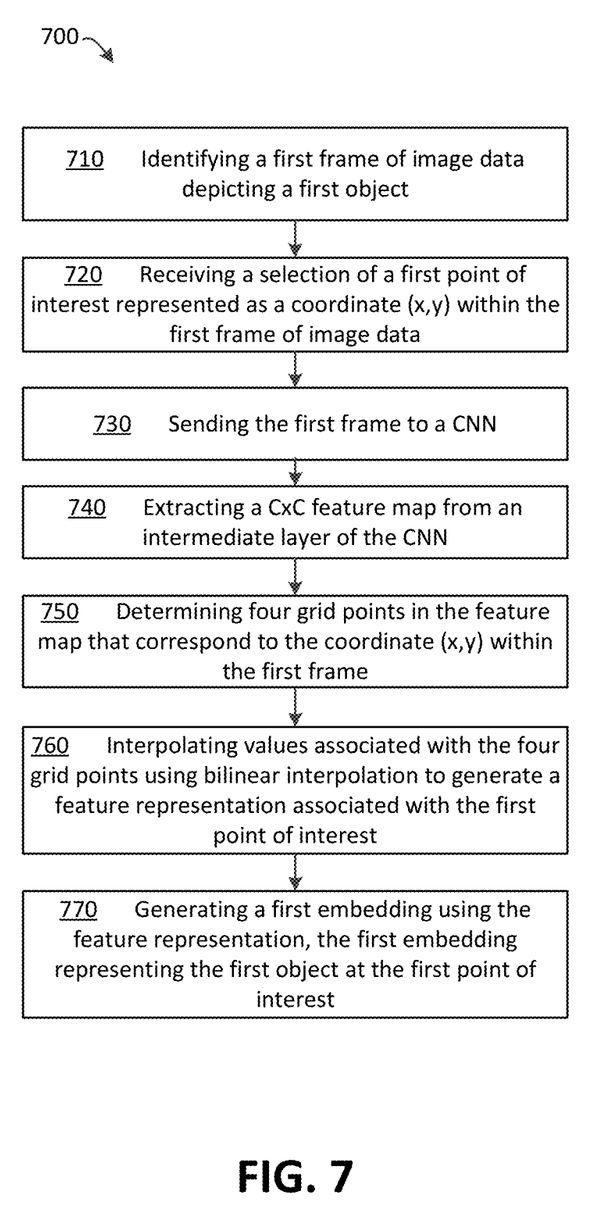
FIG. 7 is a flowchart describing an example process for encoding localized visual features of a fashion image, according to various aspects of the present disclosure.

FIG. 7 is a flowchart describing an example process 700 for encoding localized visual features of a fashion image, according to various aspects of the present disclosure. Those portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 700 may begin at action 710, at which a first frame of image data depicting a first object may be received. Although many of the examples described herein relate to encoding and/or determining localized visual similarity for fashion items, the techniques described herein may be used with any type of image data that includes localized attributes. For example, similarity between different species of plants/animals (based on local attributes such as color patterns, leaves, tree bark, etc.), artworks, different non-fashion products with localized attributes, etc. In general the techniques described herein may be used to encode and/or determine localized visual similarity for any images.

Process 700 may continue from action 710 to action 720, at which a selection of a first point of interest represented as a coordinate (x, y) within the first frame of image data may be received. In various examples, the point of interest may be received via a user selection made on a display of the first frame of image data. For example, the user may click on a portion of the interest that is of interest to the user (e.g., an attribute of a first article of clothing). Other input modalities are possible (e.g., voice, touch, etc.) beyond mouse clicks.

Process 700 may continue at action 730, at which the first frame of image data may be sent to a CNN. For example, the first frame of image data may be sent to a ResNet-50 CNN. In general, the type of backbone network used to generate feature maps is implementation dependent. Any type of backbone network that is capable of encoding frames of image data into feature maps may be used in accordance with the various techniques described herein. Feature maps may refer to spatial maps of the input image that represent the input image as feature vectors. A particular feature vector may be a semantic representation of the particular spatial portion of the image as encoded using the particular model (e.g., ResNet-50, etc.). Feature vectors may identify different semantic features of the input image such as edges, vertical lines, horizontal lines, bends, shapes, etc.

Process 700 may continue at action 740, at which a C×C feature map may be extracted from an intermediate layer of the CNN. The particular hidden layer from which to extract the feature map is implementation dependent. Generally, the deeper the layer from which the feature map is extracted, the more global features of the input frame of image data are captured.

Process 700 may continue at action 750, at which four grid points in the feature map that correspond to the coordinate (x, y) within the first frame may be determined. At action 750, four grid points in the feature map that correspond to the user-selected point of interest in the pixel space may be determined. These four grid points may surround the space where the point of interest occurs in the frame of image data—although the four grid points are in the feature space and the point of interest is in the pixel space.

Process 700 may continue at action 760, at which values associated with the four grid points may be interpolated using bilinear interpolation to generate a feature representation associated with the first point of interest. At action 760, bilinear interpolation may be used to generate a mapping of the point of interest from the pixel space to the feature space of the feature map. The bilinear interpolation may represent the point of interest in the feature space based on the relative proximity of the point of interest to each of the four feature vectors at the grid points.

Process 700 may continue at action 770, at which a first embedding may be generated using the feature representation. The first embedding may represent the first object at the first point of interest. At action 770, the localized embedding may be generated by sending the feature representation associated with the first point of interest (and/or the feature representation associated with a pixel grid surrounding the point of interest (e.g., reduced feature maps 118 of FIG. 1) to a convolutional layer. Additionally, L2 normalization may be used to generate the localized embedding 124. The localized embedding 124 may be used to perform a visual search/retrieval operation to determine similar objects (e.g., fashion items or other database items) that have both global and localized similarity, as described in reference to FIG. 4.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
receiving a selection of a first location of interest on a first image data representing at least one object;
sending the first image data to a first machine learning model;
generating, by the first machine learning model, a feature map representing the first image data, wherein the feature map comprises global representation data representing the at least one object;
generating a reduced feature map based at least in part on a mapping of the first location of interest to the feature map, wherein the reduced feature map comprises the global representation data and local representation data representing the first image data at the first location of interest; and determining a second image of a different object based at least in part on the reduced feature map.

2. The method of claim 1, further comprising:
determining a first coordinate of the first location of interest in a pixel space of the first image data;
determining a portion of the feature map spatially corresponding to the first coordinate; and
determining the reduced feature map using the portion of the feature map.

3. The method of claim 2, further comprising:
determining four coordinates in the feature map defining a rectangle that correspond to a region surrounding the first location of interest in the pixel space; and
generating a feature vector representing the first location of interest by bilinearly interpolating feature vectors of the four coordinates.

4. The method of claim 1, further comprising:
determining a grid of pixels surrounding the first location of interest in the first image data, wherein the reduced feature map represents each pixel of the grid of pixels; and
determining an embedding representing the reduced feature map using at least convolutional layer.

5. The method of claim 1, further comprising:
generating a set of training images that, for a first fashion attribute, comprise:
a reference sample that identifies the first fashion attribute;
a positive sample that includes the first fashion attribute and that is labeled as a positive match with respect to the reference sample;
a first negative sample that is labeled as a negative match with respect to the reference sample; and
a second negative sample that is labeled as the negative match with respect to the reference sample.

6. The method of claim 5, wherein:
a first margin of loss associated with the first negative sample comprises a first loss value; and
a second margin of loss associated with the second negative sample comprises a second loss value, wherein the first loss value is greater than the second loss value.

7. The method of claim 1, further comprising:
generating a first embedding using the reduced feature map;
searching an embedding space using the first embedding; and
determining a second embedding based at least in part on a similarity between the first embedding and the second embedding, wherein the second image is associated with the second embedding.

8. The method of claim 1, further comprising generating training instances used to train the first machine learning model by moving the first location of interest from a first coordinate in a pixel space of the first image data to a second coordinate in the pixel space of the first image data, wherein the second coordinate is less than or equal to a threshold distance from the first coordinate.

9. A system comprising:
at least one processor; and
non-transitory computer-readable memory storing instructions that, when executed by the at least one processor, are effective to:
receive a selection of a first location of interest on a first image data representing at least one object;
generate, by a first machine learning model, a feature map representing the first image data, wherein the feature map comprises global representation data representing the at least one object;
generate a reduced feature map based at least in part on a mapping of the first location of interest to the feature map, wherein the reduced feature map comprises the global representation data and local representation data representing the first image data at the first location of interest; and
determine a second image depicting at least a second object based at least in part on the reduced feature map.

10. The system of claim 9, the non-transitory computer-readable memory storing further instructions that, when executed by the at least one processor, are further effective to:
determine a first coordinate of the first location of interest in a pixel space of the first image data;
determine a portion of the feature map spatially corresponding to the first coordinate; and
determine the reduced feature map using the portion of the feature map.

11. The system of claim 10, the non-transitory computer-readable memory storing further instructions that, when executed by the at least one processor, are further effective to:
determine four coordinates in the feature map defining a rectangle that correspond to a region surrounding the first location of interest in the pixel space; and
generate a feature vector representing the first location of interest by bilinearly interpolating feature vectors of the four coordinates.

12. The system of claim 9, the non-transitory computer-readable memory storing further instructions that, when executed by the at least one processor, are further effective to:
determine a grid of pixels surrounding the first location of interest in the first image data, wherein the reduced feature map represents each pixel of the grid of pixels; and
determine an embedding representing the reduced feature map using at least convolutional layer.

13. The system of claim 9, the non-transitory computer-readable memory storing further instructions that, when executed by the at least one processor, are further effective to:
generate a set of training images that, for a first fashion attribute, comprise:
a reference sample that identifies the first fashion attribute;
a positive sample that includes the first fashion attribute and that is labeled as a positive match with respect to the reference sample;
a first negative sample that is labeled as a negative match with respect to the reference sample; and
a second negative sample that is labeled as the negative match with respect to the reference sample.

14. The system of claim 13, wherein:
a first margin of loss associated with the first negative sample comprises a first loss value; and
a second margin of loss associated with the second negative sample comprises a second loss value, wherein the first loss value is greater than the second loss value.

15. The system of claim 9, the non-transitory computer-readable memory storing further instructions that, when executed by the at least one processor, are further effective to:
generate a first embedding using the reduced feature map;
search an embedding space using the first embedding; and
determine a second embedding based at least in part on a similarity between the first embedding and the second embedding, wherein the second image is associated with the second embedding.

16. The system of claim 9, the non-transitory computer-readable memory storing further instructions that, when executed by the at least one processor, are further effective to generate training instances used to train the first machine learning model by moving the first location of interest from a first coordinate in a pixel space of the first image data to a second coordinate in the pixel space of the first image data, wherein the second coordinate is less than or equal to a threshold distance from the first coordinate.

17. A method comprising:
receiving a selection of a first location of interest on a first image data representing at least one object;
generating, by a first machine learning model, a feature map representing the first image data, wherein the feature map comprises global representation data representing the at least one object;
generating a reduced feature map based at least in part on a mapping of the first location of interest to the feature map, wherein the reduced feature map comprises the global representation data and local representation data representing the first image data at the first location of interest; and
determining a second image of a different object based at least in part on the reduced feature map.

18. The method of claim 17, further comprising:
determining a first coordinate of the first location of interest in a pixel space of the first image data;
determining a portion of the feature map spatially corresponding to the first coordinate; and
determining the reduced feature map using the portion of the feature map.

19. The method of claim 18, further comprising:
determining four coordinates in the feature map defining a rectangle that correspond to a region surrounding the first location of interest in the pixel space; and
generating a feature vector representing the first location of interest by bilinearly interpolating feature vectors of the four coordinates.

20. The method of claim 17, further comprising:
determining a grid of pixels surrounding the first location of interest in the first image data, wherein the reduced feature map represents each pixel of the grid of pixels; and
determining an embedding representing the reduced feature map using at least convolutional layer.

* * * * *